United States Patent [19]

Zschunke

[11] 3,927,372

[45] Dec. 16, 1975

[54] ARRANGEMENT FOR IMPROVING THE REPRODUCTION OF AMPLITUDE JUMPS DURING TRANSMISSION USING DIFFERENTIAL PULSE CODE MODULATION

[75] Inventor: Willmut Zschunke, Stuttgart, Germany

[73] Assignee: International Standard Electric Corporation, New York, N.Y.

[22] Filed: Oct. 15, 1974

[21] Appl. No.: 514,862

[30] Foreign Application Priority Data

Nov. 7, 1973 Germany ............................ 2355676

[52] U.S. Cl. ............. 325/38 B; 329/104; 332/11 D; 325/141; 325/321

[51] Int. Cl.² ............................................ H04B 1/00

[58] Field of Search ...... 325/38 A, 38 B, 38 R, 141, 325/321; 329/104, 109; 332/11 D; 179/15 AZ

[56] References Cited

UNITED STATES PATENTS 3,480,948 11/1969 Lord ................................ 325/38 R

*Primary Examiner*—Robert L. Griffin
*Attorney, Agent, or Firm*—John T. O'Halloran; Menotti J. Lombardi, Jr.; Alfred C. Hill

[57] ABSTRACT

An arrangement incorporated in a DPCM code communication system to be able to reproduce steep amplitude jumps (edge between black and white) correctly. At the receiver the maximum difference value code words transmitted are added up and delivered with a shortened delay. At the transmitter, a check is made, in case of amplitude jumps, to determine how often the maximum difference value code word is transmitted. A predetermined code word is transmitted to the receiver to end the addition in the receiver when the check in the transmitter indicates that a code word other than a maximum difference value code word is to be transmitted.

3 Claims, 5 Drawing Figures

ARRANGEMENT FOR IMPROVING THE REPRODUCTION OF AMPLITUDE JUMPS DURING TRANSMISSION USING DIFFERENTIAL PULSE CODE MODULATION

BACKGROUND OF THE INVENTION

This invention relates to code communication systems and more particularly to differential pulse code modulation (DPCM) code communication systems.

During the transmission of a signal using DPCM it is not the sample values which are transmitted directly in quantized and coded form as is the case with pulse code modulation (PCM), but rather it is the difference between two successive sample values that is transmitted. Because of the redundancy in many signals, e.g. speech and picture signals, this difference will frequently be smaller than the sample value so that transmission using DPCM requires less bits per sample value, which fact permits a reduction in the bit rate to be transmitted. However, the above assumption that the difference between two adjacent sample values is small is not correct if the signal to be transmitted shows large amplitude variations (caused in picture signals, for example, by large changes in brightness at image edges, that is, at edge between black and white). Because of the restricted dynamic range per step, the DPCM cannot follow this change, i.e., a large amplitude variation is obliterated. FIG. 1 shows an example of an amplitude jump to illustrate this effect, which is typical of DPCM and referred to as "slope overload." It was assumed that input and output signals were each band-limited by means of a low-pass filter with the cutoff frequency $f_g$, according to the sampling frequency $2f_g$, a ramp function being assumed as the low-pass filter's jump response for simplification. The signals not limited in bandwidth are shown as broken lines. Although the DPCM tries to follow the jump with the largest quantizing step $66_{max}$, the jump is clearly flattened. An increase in quantizing steps is possible only at the expense of increased quantization noise (granular noise) and, therefore, undesirable. To overcome this difficulty, an arrangement has already been proposed in a co-pending application of W. Zschunke, Ser. No. 436,002, filed Jan. 23, 1974 which is characterized in that the transmitting station and the receiving station each contain a monitoring device which monitors the difference values for their magnitude and, if a predetermined magnitude of the difference values is exceeded, causes the amplitude for this sampling point to be determined and stored together with information characteristic of the location within the line or the picture, that another device is provided in which these values are compared with corresponding values of the preceding line or of the preceding picture and in which the expected location and amplitude of a corresponding point for the next line or picture are computed from two corresponding points and are stored, that during the sampling of the next line or picture the feedback loop for the differential pulse code modulation coder is opened at the predicted point, and that the computed amplitude is injected into said loop instead.

SUMMARY OF THE INVENTION it is an object of this invention to provide an arrangement for improving the reproduction of amplitude jumps (slope correction) during transmission using DPCM which needs no device for improved prediction.

A feature of the present invention is the provision of an arrangement for improving the reproduction of amplitude jumps in a differential pulse code modulation (DPCM) system comprising: a transmitter transmitting at least maximum difference value code words during the amplitude jumps; and a receiver including a conventional DPCM demodulator coupled to the transmitter, a delay device having several feed points connected to the demodulator, logic circuitry coupled to the transmitter to recognize when the maximum difference value code words are received, and a counter coupled to the logic circuitry and the feed points, the counter being advanced one position whenever two successive maximum difference value code words are recognized by recognized logic circuitry and being reset to its initial position which at least one code word represents a value different than the maximum difference value, the position of the counter determining which of the feed points connects the demodulator to the delay device.

This offers the advantage that the maximum amplitude values can be added up in a simple manner. Furthermore, this arrangement can be realized at relatively low cost and thus is suitable for use in transmission systems with one transmitting station and many receiving stations, for example.

It may also be possible, however, that a signal does not rise so steeply. In that case, the receiver would generate too steep an output signal.

Therefore, another feature of this invention is the provision of the transmitter including a circuit coupled to a conventional DPCM modulator having a feedback loop, the circuit deriving a write instruction from the condition "value to be transmitted equal to maximum difference value and previously transmitted value unequal to the maximum difference value," a storage device coupled to the circuit and the input of the modulator responsive to the write instruction to store an input value, a subtractor coupled to the storage device and the feedback loop to subtract the input value from the value circulating in the feedback loop to produce a remaining difference value, a comparator coupled to the subtractor to compare the remaining difference value from the maximum difference value, and logic circuitry coupled to the modulator and the comparator to cause transmission of a special code word rather than the value actually provided for transmission if the output signal of the comparator falls below a predetermined minimum value.

This offers the advantage that the normally uninterrupted sequence of maximum DPCM signals is interrupted in the transmitter if necessary, the receiver thus performing no undesired addition of the signals.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
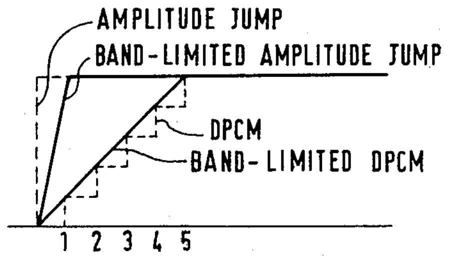
FIG. 1 is a diagram showing the effect of an amplitude jump during transmission using the well-known DPCM.
Figure 2:
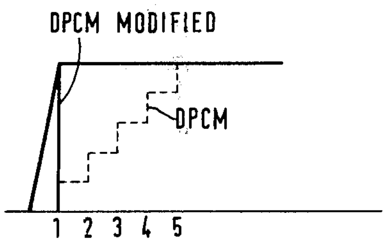
FIG. 2 is a diagram explaining the principle of operation of the present invention.

With reference to the example of FIG. 1 the principle will be explained with the aid of FIG. 2. Instead of rising at each sampling point only by the step height $\Delta_{max}$, the amplitude increases immediately by the number m of the successive $\Delta_{max}$-values, i.e., by $m \cdot \Delta_{max}$, at the sample value designated 1. However, since this value is not available until after the time m · T ($T = 1/2f_g$ sampling interval from point to point),
but is needed $(m-1)T$ earlier, namely, at the sample value 1, i.e., $(m-1)T$ before the sample value after the time $m$T, obtained by conventional DPCM, it is necessary to delay the sample values obtained by conventional DPCM by $(m-1)T$ with respect to this sample value. FIG. 2 shows, for the example $m = 5$, the curve obtained in this way (solid line) — to permit a comparison and for clarity the curve is shown with a $(m-1)T$ lead — and, beside it, the known response in case of DPCM. Since m sampling values were combined into a single jump, $m-1$ points are lacking for the remaining signal curve. As shown in FIG. 2, these points are given the value of the sample value determined last because this is the easiest thing to do. Improvements are possible by linear interpolation. As can be seen from FIG. 2, a considerable improvement in the reproduction of the amplitude jump (in the example even an ideal reproduction) is achievd upon conventional DPCM (broken line).

Figure 3:
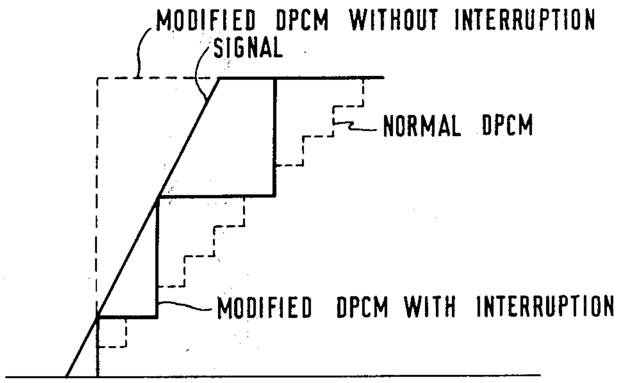
FIG. 3 is a diagram explaining the operation with amplitude jumps that are not as steep as the amplitude jump of FIG. 2.

In the case of jumps not rising within one sampling interval, i.e., in the case of more slowly rising amplitude responses, caution must be used if the above strategy is employed. FIG. 3 shows that the curve achieved in this way (broken line) rises too steeply, i.e. also results in a falsification compared with the original curve.

This difficulty can be overcome by leaving the approach described after a number of points $m_x$ and then starting again from the beginning. It would be beneficial if the number of points $m_x$ could be chosen optimally, e.g. to obtain minimum quantization noise, depending on the shape of the curve. This, however, is a non-linear problem which cannot be solved by simply providing suitable equipment. In the following an arrangement will be described which, while not being optimal in the above sense, gives better results than conventional DPCM and is relatively easy to realize.

In this solution it is insured that the original curve is not exceeded by the output signal of the DPCM system. At the occurrence of the highest difference $\Delta_{max}$ the original value to be processed is stored (at the beginning of the curve the sample value 1), and $\Delta_{max}$-words are transmitted only as long as this stored sample value is not exceeded. Then, an interruption of the sequence takes place. Thereafter, $\Delta_{max}$-words can be transmitted again and can be evaluated at the receiving end in accordance with the aforementioned algorithm. This is shown by the solid line in FIG. 3. The output voltage of the DPCM system modified in this way will thus lie between the original signal and the output signal of a conventional DPCM system. The receiver must, however, be informed when the algorithm is to be interrupted unless already the last value differs from $\Delta_{max}$. To do this, there are, for example, the following possibilities.

a. Instead of transmitting the largest possible difference value $\Delta_{max}$, the second largest difference value $\Delta m-1$ is transmitted. The result is, however, that at these points of the transmission of the second largest difference value the reproduced curve lies below the curve obtained by conventional DPCM. However, since the other points lie considerably closer to the original curve, the quality of reproduction is improved nevertheless.

b. If a $\Delta_{max}$-value is followed by the second largest difference value, this is interpreted at the receiving end as the conclusion of the algorithm, but this value is still given the weight of the largest difference value from the point of view of amplitude. This avoids the disadvantage of solution (a), but does not permit a sequence "largest - second-largest difference," actually occurring as a result of the signal waveform, to be transmitted in accordance with the original curve.

c. If, for small positive and negative differences, the range of the quantization characteristic around zero is alotted the code word for the difference 0 to suppress noise and if the same number of positive and negative output amplitude steps of the quantizer is used, an odd number of code words is obtained, i.e., if an n-bit code has $2^n$, i.e. an even number of code words, a code word is obtained which is either ambiguous or is interpreted in accordance with certain arrangements made at the receiving and transmitting ends or, applied to the method proposed, can be used to signal the end of the algorithm with the value of the amplitude $\Delta_{max}$.

d. After a predetermined number m of $\Delta_{max}$-words the receiver automatically interrupts the algorithm and starts it again at the next $\Delta_{max}$-word. This has a disadvantage in that the break-off instant used is not always the one advantageous to the respective rise of the amplitude variation.

Figure 4:
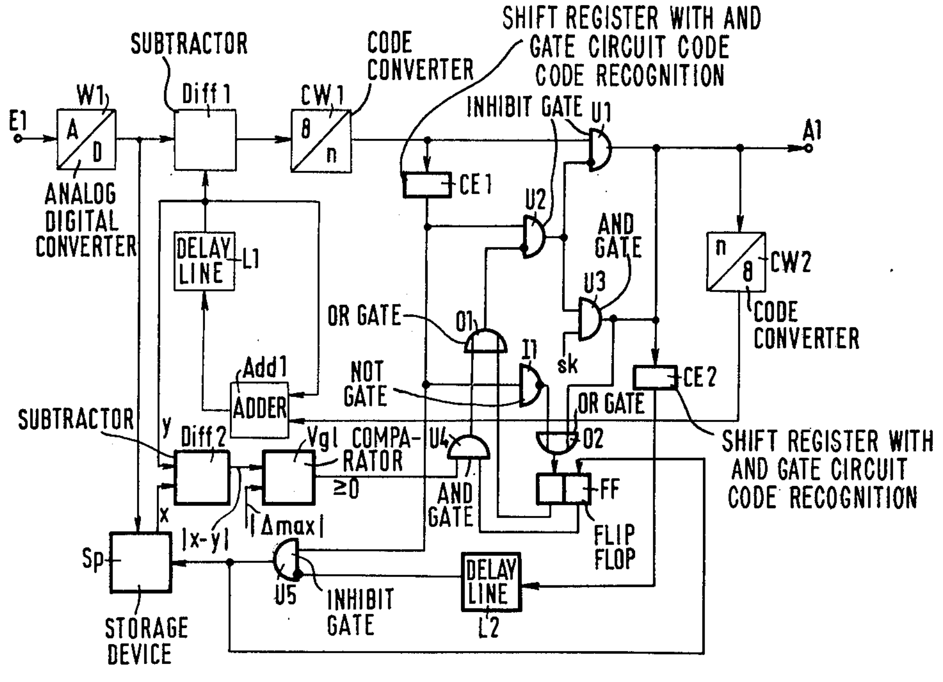
FIG. 4 is a block diagram of the transmitting end of the DPCM system according to the principles of the present invention.

In the following the transmitting and receiving ends of a DPCM system modified according to the method proposed will be explained with the aid of FIGS. 4 and 5. To conclude the algorithm, the transmission of the second-largest amplitude value is used in accordance with proposal (a).

First the known transmission will be briefly explained again. The analog signal sample value applied to the input E1 (FIG. 4) is converted in the analog-to-digital converter W1 to digitalized form with, e.g., 8 bits. Then, in the subtractor Diff1, the difference from the preceding sample value is formed. The difference value so obtained is subsequently converted, in a code converter CW1, to an n-bit (e.g. $n = 4$) code word which is transmitted via the output A1 to the receiving station. The code word to be transmitted is reconverted, in a further code converter CW2, to an 8-bit code word and than added, in the 8-bit adder Add1, to the preceding sample value. In a delay line L1 this sum is delayed by the duration of one sampling interval between two points and then is applied, for the next sample value, to one input of the subtractor Diff1 and to one input of the 8-bit adder Add1.

In the receiving station (FIG. 5) the code word received via the input E2 is reconverted, in a code converter DW3, to an 8-bit code word which is then added, in the adder Add2, to the value of the preceding sample value, which is applied from the output of the added to the input of the adder via a delay line L4. The adder's output signal is then converted, in a digital-to-analog converter W2, to an analog sample value and appears at the output A2 for further processing.

With the additional devices of the receiving station the sharp amplitude increase shown in FIG. 2, for example, can be better reproduced.

Since an added-up amplitude value, as explained hereinabove, must be available earlier than it is actually transmitted, all signals are delayed in the receiving station by ($m$—1) sampling intervals. In the case of an added-up amplitude value the delay is then correspondingly reduced, so that the value is available at the output at the time desired. To this end, all output signals of the adder Add2 are passed through a delay device VE before being applied to the converter W2. The delay device VE is composed of ($m$—1) delay lines L5, L6, L7 . . . L$m$—1 which are connected in series via INHIBIT gates U7 and U9. These INHIBIT gates, the additional AND gates U8, U10 and U12 and the additional INHIBIT gate U11 are controlled as a function of the position of a counter Z whose normal position is the position 1. In this position the output signals of adder Add2 are applied to the input of delay line L5 and then pass through the other elements. For the control of counter Z the incoming code words are monitored in a shift register with AND gate circuit CE3 as to whether the code word represents the value $\Delta_{max}$. Circuit CE3, as well as the shift register with AND gate circuits CE1 and CE2 of FIG. 4, may be implemented by a shift register having the same number of stages as the bits of a code word and an AND gate coupled to an appropriate output of each stage with the AND gate providing an output when the code word to be recognized is present in the stages of the shift register.

Figure 5:
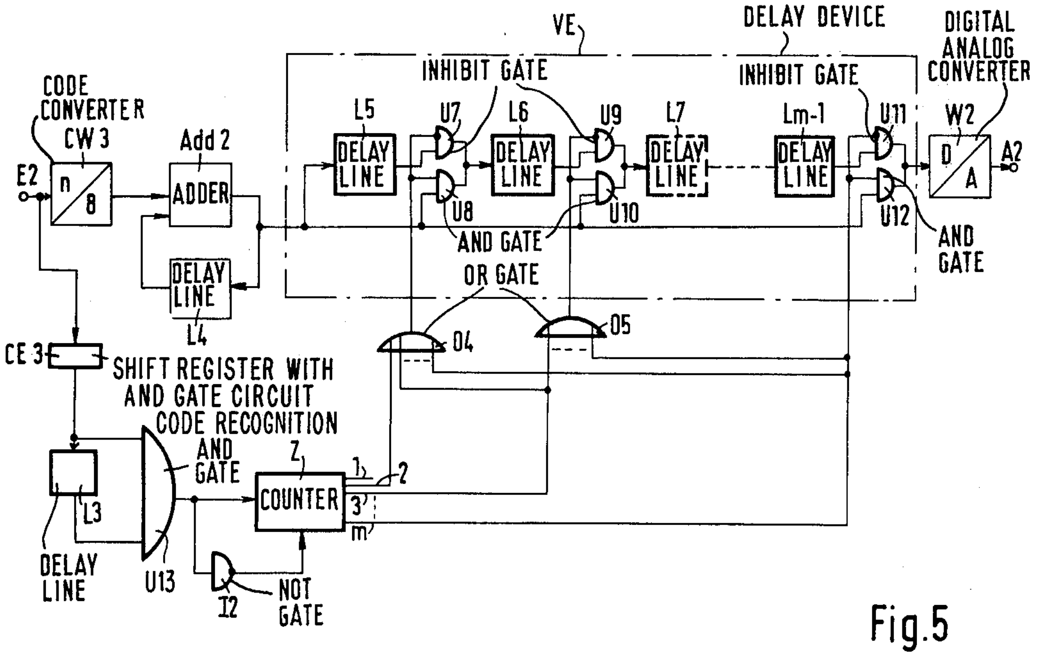
FIG. 5 is a block diagram of the receiving end of the DPCM system according to the principles of the present invention.

As shown in FIG. 5 circuit CE3 applies a signal to one input of the AND gate U13 and to delay line L3. If the next code word has the value $\Delta_{max}$, too, the AND condition is satisfied and counter Z is advanced to the position 2. In this position the INHIBIT gate U7 is inhibited via the OR gate 04, and AND gate U8 is enabled. The adder's output signal is now applied to delay line L6 and continues to be applied to delay line L5. The signal appearing at the output of delay line L5, which signal represents the preceding sample value, cannot be passed on to delay line L6 because INHIBIT gate U7 is inhibited.

Analogously, after three successive $\Delta_{max}$ code words, the counter is in the position 3 and the adder's output signal is applied to the first three delay lines L5 – L7 in a parallel manner. In the position m of the counter the adder's output signal is applied in parallel manner to all delay lines and directly to the input of the converter W2.

As soon as the sequence of code words $\Delta_{max}$ is interrupted, AND gate 13 stops producing output signals and the counter Z is reset to 1 via the NOT gate 12.

The highest position m of the counter and thus the number ($m$—1) of delay stages needed in the receiver is given by the maximum number of successive $\Delta_{max}$-code words to be expected or usable for the method. In the case of signals with a predetermined amplitude range, such as television signals, the maximum number $m$ of $\Delta_{max}$-code words or $\Delta_{max}$-amplitudes is given by the number of $\Delta_{max}$-amplitudes necessary to cover the entire amplitude range. In the case of signals whose amplitude range is not strictly limited, such as speech signals, there are no problems if the counter returns to the position 1 after reaching its highest position. This is used to interrupt the algorithm of the summation taking place with a time lead. Automatic conclusion according to proposal (d) is thus possible by limiting the maximum count $m$.

Since in case of the transmission of a $\Delta_{max}$ code word it cannot yet be said whether the amplitude increase is as shown in FIG. 2 or FIG. 3, a shift register with AND gate circuit CE1 is also connected to the output of the code converter CW1 in the sending station (FIG. 4), which circuit CE1 provides a signal if a $\Delta_{max}$ code word is detected. This signal passes through the INHIBIT gate U5 and gives a write instruction to the storage device S$p$, which now records the digitalized sample value corresponding to the 1 value in FIGS. 2 or 3. The write instruction also changes the state of a flip-flop FF which enables the AND gate U4. Thus, the inhibit input of the INHIBIT gate U2 is now dependent on the output signal of a comparator V$gl$, which will be described in more detail in the following.

A subtractor Diff2 now forms the difference ($x$—$y$) between the stored value x and the last sample value $y$ circulating in the loop of the convention DPCM coder. This difference value is then fed to the comparator V$gl$ and compared with the value $\Delta_{max}$. If the difference value is greater or equal to the value $\Delta_{max}$, the comparator provides a signal which keeps INHIBIT gate U2 inhibited via the AND gate U4 and the OR gate 01. The output signal of code converter CW1 now reaches the output via the INHIBIT gate U1. These output signals are supervised for the $\Delta_{max}$ code word in another shift register with AND gate circuit CE2. If the next code word of the code converter CW1 is again a $\Delta_{max}$ code word, it cannot trigger a new write instruction for the storage device Sp following recognition in the circuit CE1 because INHIBIT gate U5 is inhibited by the output signal provided by circuit CE2 and delayed in the delay line L2.

Further $\Delta_{max}$ code words are transmitted in the same manner until comparator V$gl$ determines that the difference value, which is constantly being formed anew, is smaller than the value $\Delta_{max}$. In this case, comparator V$gl$ provides no output and thus enables INHIBIT gate U2, which inhibits INHIBIT gate U1 and simultaneously enables the AND gate U3. Applied to this AND gate U3 is the code work sk, which indicates the end of the algorithm and is now transmitted instead of the code word $\Delta_{max}$ provided by the code converter CW1. As assumed hereinabove, the code value $\Delta_{max-1}$ is now transmitted. It is, of course, also possible to transmit now the special code according to proposal (c). At the same time, a signal is derived from the output of AND gate U3 which signal resets flip-flop FF via the OR gate 02. The new output signal of flip-flop FF now inhibits INHIBIT gate U2 again via the OR gate 01 and the normal state prevails again. If now, according to the curve of FIG. 3, the next code word has again the value $\Delta_{max}$, the sample value is again entered into storage device S$p$. INHIBIT gate U5 has been enabled, because the value $\Delta_{max}$ was transmitted as the last code word.

If an amplitude jump has the value 2.5 · $\Delta_{max}$, for example, the code word $\Delta_{max}$ is no longer obtained for the third sample value. In this case, circuit CE1 no longer produces an output signal and controls via NOT gate 11 and OR gate 02, the resetting of flip-flop FF, which inhibits INHIBIT gate U2, independently of the comparator's output signal. The output signal provided by code converter CW1 and having the value 0.5 · $\Delta_{max}$ is transmitted via INHIBIT gate U1.

In the receiving station, this code word, like the code word $\Delta_{max-1}$, causes the counter to be reset and thus the special summation of the amplitudes for the amplitude jump is concluded.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement for improving the reproduction of amplitude jumps in a differential pulse code modulation (DPCM) system comprising:
   a transmitter including
      a source of digital input signals,
      a transmitter output,
      a DPCM modulator having
         a first subtractor having one input coupled to said source to provide a first output signal equal to the difference value between a present sample value and a preceding sample value, said first subtractor providing at least maximum difference value code words during said amplitude jumps for transmission, the output of said first subtractor being coupled to said transmitter output,
         a first delay means having its output coupled to the other input of said first subtractor, said first delay means having a delay equal to one sampling interval, and
         a first adder having one input coupled to the output of said first subtractor, the other input coupled to the output of said first delay means and its output coupled to the input of said first delay means,
      a first means coupled to the output of said first subtractor, to provide a second output signal when said maximum difference value code words are detected,
      a second means coupled to the output of said first subtractor to provide a third output signal when said maximum difference value code words are detected,
      an inhibit gate coupled to the output of each of said first and second means,
      said first and second means and said INHIBIT gate cooperating to provide a write instruction at the output of said INHIBIT gate for the condition "value to be transmitted equal to maximum difference value and previously transmitted value unequal to said maximum difference value",
      a storage device coupled to said source and said INHIBIT gate responsive to said write instruction to store the value of the present one of said input signals,
      a second subtractor coupled to said storage device and the output of said first delay means to subtract said stored value of the present one of said input signals from the value at the output of said first delay means to produce a remaining difference value,
      a comparator coupled to said second subtractor to compare said remaining difference value with said maximum difference value, said comparator providing a fourth output signal when said remaining difference value is equal to or greater than said maximum difference value,
      first logic circuitry coupled to said comparator and said first subtractor to enable transmission from said first subtractor of said maximum difference value code words when said fourth output signal is present, and
      second logic circuitry coupled to said first logic circuitry and said transmitter output to cause transmission of a special code word rather than the value actually provided for transmission by said first subtractor when said fourth output signal is not present; and
   a receiver including
      a DPCM demodulator having
         a second adder having a serial output and one input coupled to said transmitter output, and
         a second delay means coupled between said serial output of said second adder and the other input of said second adder, said second delay means having a delay equal to said one sampling interval
      a delay arrangement having several delay devices,
      a third means coupled to said transmitter output to provide a fifth output signal when said maximum difference value code words are detected,
      third logic circuitry coupled to said third means responsive to said fifth output signal to provide a control signal,
      a counter coupled to said third logic circuitry, said counter being advanced one count position whenever said control signal indicates two successive maximum difference value code words have been detected by said third means and being reset to its initial count position when said control signal indicates at least one code word representing value different that said maximum difference value has been detected by said third means, and
      fourth logic circuitry coupled to said counter, each of said delay devices and said serial output to connect the first n of said delay devices to said serial output as a function of the count position n of said counter, where n is an integer greater than one, said fourth logic circuitry also preventing the value stored at all but the last one of said first n of said delay devices from being passed to the output of said delay arrangement.

2. In an arrangement for improving the reproduction of amplitude jumps in a differential pulse code modulation (DPCM) system, a transmitter comprising:
   a source of digital input signals;
   a transmitter output;
   a DPCM modulator including
      a first subtractor having one input coupled to said source to provide a first output signal equal to the difference value between a present sample value and a preceding sample value, said first subtractor providing at least maximum value code words during said amplitude jumps for transmission, the output of said first subtractor being coupled to said transmitter output,
      a delay means having its output coupled to the other input of said first subtractor, said delay means having a delay equal to one sampling interval, and
      an adder having one input coupled to the output of said first subtractor, the other input coupled to the output of said delay means and its output coupled to the input of said delay means;

a first means coupled to the output of said first subtractor to provide a second output signal when said maximum difference value code words are detected;

a second means coupled to the output of said first subtractor to provide a third output signal when said maximum difference value code words are detected;

an INHIBIT gate coupled to the output of each of said first and second means;

said first and second means and said INHIBIT gate cooperating to provide a write instruction at the output of said INHIBIT gate for the condition "value to be transmitted equal to maximum difference value and previously transmitted value unequal to said maximum difference value";

a storage device coupled to said source and said INHIBIT gate responsive to said write instruction to store the value of the present one of said input signals;

a second subtractor coupled to said storage device and the output of said delay means to subtract said stored value of the present one of said input signals from the value at the output of said delay means to produce a remaining difference value;

a comparator coupled to said second subtractor to compare said remaining difference value with said maximum difference value, said comparator providing a fourth output signal when said remaining difference value is equal to or greater than said maximum difference value;

first logic circuitry coupled to said comparator and said first subtractor to enable transmission from said first subtractor of said maximum difference value code words when said fourth output signal is present; and second logic circuitry coupled to said first logic circuitry and said transmitter output to cause transmission of a special code word rather than the value actually provided for transmission by said first subtractor when said fourth output signal is not present.

3. In an arrangement for improving the reproduction of amplitude jumps in a differential pulse code modulation (DPCM) system, a receiver comprising:

an input for difference value code words including maximum difference value code words during said amplitude jumps;

a DPCM demodulator including an adder having a serial output and one input coupled to said input, and a delay means coupled between said serial output of said adder and the other input of said adder, said delay means having a delay equal to said one sampling interval, a delay arrangememnt having several delay devices;

first logic circuitry coupled to said input to provide a first output signal when said maximum difference value code words are detected;

second logic circuitry coupled to said first logic circuitry responsive to said first output signal to provide a control signal;

a counter coupled to said second logic circuitry, said counter being advanced one count position whenever said control signal indicates two successive maximum difference value code words have been detected by said first logic circuitry and being reset to its initial count position when said control signal indicates at least one code word representing a value different than said maximum value has been detected by said first logic circuitry; and third logic circuitry coupled to said counter, each of said delay devices and said serial output to connect the first n of said delay devices to said serial output as a function of the count position *n* of said counter, where *n* is an integer greater than one, said third logic circuitry also preventing the value stored at all but the last one of said first n of said delay devices from being passed to the output of said delay arrangement.

* * * * *